A. C. CHAMPAGNE & J. N. BRAHN.
CARBORUNDUM DRESSER.
APPLICATION FILED MAY 2, 1911.
1,026,494.
Patented May 14, 1912.
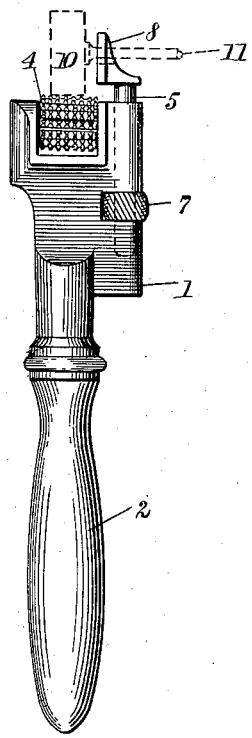
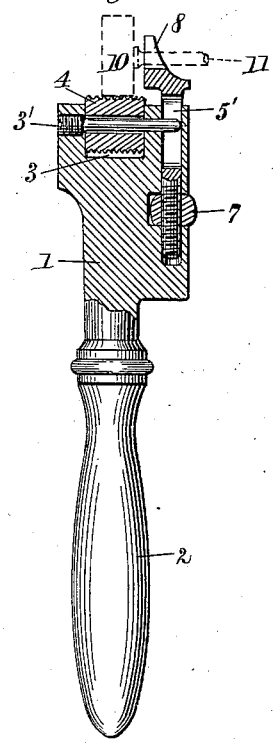
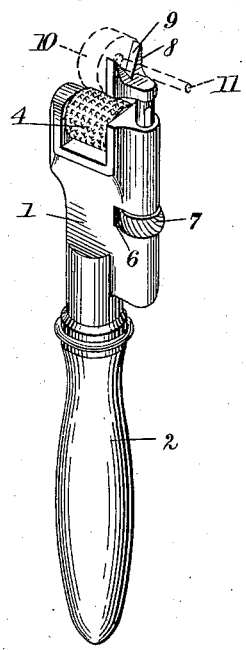
WITNESSES
INVENTORS
Alphonse C. Champagne
John N. Brahn
BY
ATTORNEYS

UNITED STATES PATENT OFFICE.

ALPHONSE CLARENCE CHAMPAGNE AND JOHN NELSON BRAHN, OF JERSEY CITY, NEW JERSEY.

CARBORUNDUM-DRESSER.

1,026,494.     Specification of Letters Patent.     Patented May 14, 1912.

Application filed May 2, 1911. Serial No. 624,552.

*To all whom it may concern:*

Be it known that we, ALPHONSE C. CHAMPAGNE and JOHN N. BRAHN, both citizens of the United States, and residents of Jersey City, in the county of Hudson and State of New Jersey, have invented a new and Improved Carborundum-Dresser, of which the following is a full, clear, and exact description.

Our invention is a dressing tool for renewing the surface of wheels used by dentists in finishing fillings and grinding away teeth. Such wheels are made of carborundum in practice, and the circumference of these wheels becomes worn smooth after extended use.

Our invention resides in an improved construction by means of which the necessary degree of roughness of the peripheries of such wheels can be restored, and thus the period during which they can be employed considerably lengthened.

Reference is to be had to the accompanying drawings forming a part of this specification, in which the same characters of reference indicate the same parts in all the views.

Figure 1 is a side elevation of our improved dressing tool; Fig. 2 is a view similar to Fig. 1, showing the head of the tool in section; and Fig. 3 is a perspective view of a dressing tool.

Our improved dresser comprises a head 1 of metal, having a handle 2, which may be of wood or hardened rubber, or any other suitable material. In the top of the head 1 is a recess 3, across which passes a pivot pin 3', on which is mounted a roughening roller 4. This roller 4 has a suitable number of teeth or points on its periphery to cut or scratch the surface of the wheel which is to be reformed, and the roller itself must of course be formed of good, hard steel to give the desired result.

At one side of the recess 3 containing the roller 4 is formed a longitudinal bore in the head 1, in which is mounted to have longitudinal movement, a shank 5. The lower end of this shank is threaded and passes across a recess 6 in the side of the head 1, which contains an adjusting nut 7. This adjusting nut receives the threaded inner end of the shank 5. By turning the nut 7, the shank 5 can be moved in or out, as required. Near the outer end of this shank is formed a longitudinal slot 5', which receives the inner end of the pivot pin 3'. This pivot pin 3' prevents the withdrawal of the shank 5 from the head, thus obviating any danger of the parts getting separated and lost. On the outer end of the shank 5 is formed a head 8, and this head has a notch 9 therein, which serves as a bearing for the stem 11 of the wheel 10.

To use our improved dresser when a grinding wheel such as shown in dotted lines at 10, has become worn smooth, the stem 11 thereof is connected to the driving shaft of the dental engine, and the shank 5 is adjusted to such a position that when the stem 11 rests in the notch 9, the periphery of the wheel 10 will be in contact with the roughening roller 4. The dental engine is then set in motion, rotating the wheel 10, and as this wheel rotates, its curved surface will strike the points or teeth on the roughening roller 5, and its surface will therefore be cut and scratched until the required degree of roughness can be obtained. The wheel is then ready for further use.

By means of our invention a polishing wheel of any size can be renewed at any time, simply by making the required adjustment of the head 8; and the roughening roller can be replaced when worn out, simply by removing the pivot pin 3'.

Having thus described our invention, we claim as new and desire to secure by Letters Patent:

1. A dressing tool for roughening and renewing the surfaces of grinding wheels, comprising a head having a roughening roller mounted therein, and having a bore formed transversely therein with respect to the axis of the roughening roller, a shank mounted in said bore, said shank having a longitudinal slot, and a pivot pin for said roughening roller, said pin being extended to pass through said slot to the opposite side of said bore, to prevent the withdrawal of said shank from said longitudinal bore.

2. A dressing tool for roughening and renewing the surfaces of grinding wheels, comprising a head, a roughening roller mounted in said head, a longitudinal bore formed in said head and extending transversely of the axis of said roughening roller, a pivot pin on which said roughening roller is mounted, said pin having its inner end extending across said longitudinal bore, a shank mounted in said longitudinal bore and having a longitudinal slot formed therein to receive the end of the pivot pin, the inner end of said shank being threaded, and an adjusting nut carried by the inner end of said shank, said adjusting nut being located in a recess in the head, so as to be operable from without, said shank having a bearing formed in its outer end to receive the operating shank of the polishing wheel and support the same in position to contact with the roughening roller.

3. A dressing tool for roughening and renewing the surfaces of grinding wheels, comprising a head having a handle projecting therefrom and having a recess in one side thereof, a roughening roller mounted in said recess, and shaft-bearing means comprising a shank carried by a bore formed in said head and projecting therefrom adjacent said roller and longitudinally adjustable with respect thereto.

4. A dressing tool for roughening and renewing the surfaces of grinding wheels, comprising rotary roughening means and a bearing member to receive and support the shaft of the grinding wheel in operative relation to said roughening means, said bearing member being adjustable, and means forming a continuation of the axis around which the roughening means rotates, for engaging the bearing member to limit the amount of adjustment thereof.

5. A dressing tool for roughening and renewing the surfaces of grinding wheels, comprising a head having rotary roughening means mounted therein and having a bore, a bearing member adjustably mounted in said bore to receive and support the shaft of the grinding wheel in operative relation to the roughening means, and means forming a continuation of the axis around which the roughening means rotates, and engaging the bearing member inside the bore to limit the amount of adjustment of said bearing member and prevent the separation thereof from said head.

In testimony whereof we have signed our names to this specification in the presence of two subscribing witnesses.

ALPHONSE CLARENCE CHAMPAGNE.
JOHN NELSON BRAHN.

Witnesses:
 EDWIN J. DONOHUE,
 ISAAC SMITH.

---

Copies of this patent may be obtained for five cents each, by addressing the "Commissioner of Patents, Washington, D. C."